US006563861B1

(12) United States Patent
Krasny et al.

(10) Patent No.: US 6,563,861 B1
(45) Date of Patent: May 13, 2003

(54) DOPPLER SPREAD ESTIMATION SYSTEM

(75) Inventors: Leonid Krasny, Cary, NC (US);
Sandeep Chennakeshu, Cary, NC (US); David Koilpillai, Apex, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/273,480

(22) Filed: Mar. 22, 1999

(51) Int. Cl.[7] .......................... H04B 15/00; H04K 1/00; H04L 27/30
(52) U.S. Cl. .................... 375/150; 375/142; 375/343
(58) Field of Search ................... 375/142, 144, 375/147, 148, 150, 224, 226, 343, 346, 349, 267; 702/77; 714/714

(56) References Cited

U.S. PATENT DOCUMENTS

| | | | |
|---|---|---|---|
| 4,633,411 A | * 12/1986 | Bliss | 702/77 |
| 4,706,286 A | 11/1987 | Sturza | 380/34 |
| 4,723,303 A | 2/1988 | Koch | |
| 5,016,017 A | 5/1991 | Kodera et al. | |
| 5,220,584 A | * 6/1993 | Burns | 375/340 |
| 5,272,446 A | * 12/1993 | Chalmers et al. | 329/304 |
| 5,999,579 A | * 12/1999 | Uchishima et al. | 375/347 |
| 6,134,262 A | * 10/2000 | Kitade et al. | 375/142 |
| 6,219,391 B1 | * 4/2001 | Nakano | 375/346 |

FOREIGN PATENT DOCUMENTS

EP 0822668 4/1998 ............ H04B/1/69

OTHER PUBLICATIONS

Wen–yi Kuo et al., "Design for Pilot–Symbol–Assisted Burst–Mode Communications with Fading and Frequently Uncertainty", *International Journal of Wirless Information Networks*, vol. 1, No. 4, pp. 239–252.

* cited by examiner

Primary Examiner—Phuong Phu
(74) Attorney, Agent, or Firm—Moore & Van Allen PLLC; Gregory Stephens

(57) ABSTRACT

A receiving apparatus Doppler spread estimator includes a receiver receiving signals over a transmission channel that varies over time due to fading and converting the signals to digital samples for processing. A stationarizer operatively associated with the receiver stationarizes the digital samples. An estimator is operatively associated with the stationarizer for estimating spectral density of the stationarized digital samples. The correlator is operatively coupled to the estimator for correlating the spectral density estimates with functions corresponding to hypotheses of plural Doppler spread values to select one of the Doppler spread values as an estimate of actual Doppler spread.

30 Claims, 2 Drawing Sheets

US 6,563,861 B1

DOPPLER SPREAD ESTIMATION SYSTEM

FIELD OF THE INVENTION

This invention relates to wireless communication systems and, more particularly, to a method and apparatus for Doppler spread estimation in a wireless communication system.

BACKGROUND OF THE INVENTION

In wireless mobile communication systems the transmission channel can vary with time. This is due to the mobility of the transmitter and/or the receiver. Variations in the transmission channel are characterized by the Doppler spectrum. The Doppler spectrum is the Fourier transform of the autocorrelation function of the channel's time impulse response. The width of the Doppler spectrum is referred to as the Doppler spread in "Microwave Mobile Communications," W. C. Jakes, Jr., ed., New York: Wiley, 1974, IEEE Press, 1994, and "Wireless Communication," Theodore S. Rappaport, Prentice Hall PTR, 1996. The Doppler spread is commonly used as a measure of the channel variation rate or fading rate.

It is often desirable to estimate the Doppler spread. For example, in order to adaptively optimize a coherent detector in a receiver, the parameters of the adaptation algorithm are made to be a function of the estimated Doppler spread. Also, in a cellular mobile telephone system, the handoff process can be enhanced if an estimate of the Doppler spread is available. This avoids handoff of fast moving users to micro cells.

U.S. Pat. Nos. 4,723,303 and 5,016,017 discuss the use of Doppler spread estimation. Both patents describe estimating the Doppler spread from the received signal itself However, these methods may not give a good estimate with a non-stationary received signal. Lars Lindbom, "Adaptive Equalization for Fading Mobile Radio Channels," Techn.Lic.Thesis No. UPTEC 92124R, November 1992, Department of Technology, Uppsala University, Uppsala, Sweden, discloses a method of estimating the Doppler spread from a sequence of channel estimates. This method uses differentials of the channel estimate, which comprise difference of values between two points in time. However, the differential itself is generally very noisy and needs averaging. As a result, the average gives biased estimates of the Doppler spread.

Still another proposal improves Doppler estimation by adaptive filters controlled by the final Doppler spread estimate. However, this is done with a significant increase of receiver complexity, while the estimate remains biased.

The present invention is directed to overcoming one or more of the problems discussed above in a novel and simple manner.

SUMMARY OF THE INVENTION

In accordance with the invention there is provided a receiver Doppler spread estimator which utilizes stationarization of a non-stationary received signal.

Broadly, in accordance with one aspect of the invention, there is disclosed a Doppler spread estimator including receive means for receiving signals over a transmission channel that varies over time due to fading, and converting the signals to digital samples for processing. First processing means are operatively associated with the receive means for stationarizing the digital samples. Second processing means are operatively associated with the first processing means for estimating spectral densities of the stationarized digital samples. Third processing means are operatively coupled to the second processing means for correlating the spectral density estimates with functions corresponding to hypotheses of plural Doppler spread values to select one of the Doppler spread values as an estimate of actual Doppler spread.

It is a feature of the invention that the receive means is adapted to receive code division multiple access (CDMA) signals.

It is a further feature of the invention that channel coefficients are obtained directly from the CDMA signals.

It is another feature of the invention that the receive means is adapted to receive signals including pilot symbols spread with a known CDMA spreading code.

It is another feature of the invention that the received signal represents a sequence of transmitted symbols and the first processing means comprises a mixer for mixing the digital samples with a complex conjugate of the transmitted symbols. The complex conjugate of the transmitted symbols is derived from a channel estimator.

It is another feature of the invention that the first processing means comprises a low pass filter.

It is another feature of the invention that the second processing means develops vector data representing spectral components.

It is still another feature of the invention that the third processing means comprises a multi-channel correlator. The correlator calculates correlations between estimated spectral densities and weighting functions corresponding to the hypotheses of the plural Doppler spread values. The third processing means includes a selector for selecting the hypothesis producing a highest correlation value.

In accordance with another aspect of the invention, there is disclosed a receiving apparatus Doppler spread estimator including a receiver receiving signals over a transmission channel that varies over time due to fading and converting the signals to digital samples for processing. A stationarizer operatively associated with the receiver stationarizes the digital samples. An estimator is operatively associated with the stationarizer for estimating spectral density of the stationarized digital samples. The correlator is operatively coupled to the estimator for correlating the spectral density estimates with functions corresponding to hypotheses of plural Doppler spread values to select one of the Doppler spread values as an estimate of actual Doppler spread.

There is disclosed in accordance with a further aspect of the invention a method of estimating Doppler spread of a received signal comprising the steps. of receiving the signals over a transmission channel that varies over time due to fading, and converting the signals to digital samples for processing; stationarizing the digital samples; estimating spectral density of the stationarized digital samples; and correlating the spectral density estimates with functions corresponding to hypotheses of plural Doppler spread values to select one of the Doppler spread values as an estimate of actual Doppler spread.

More particularly, the present invention relates to a method and apparatus for Doppler spread estimation in a wireless communication system. The Doppler spread information can be used to optimize performance of a communication system. Applications include both base and mobile station receivers where a coherent detector is the preferred detector type.

Further features and advantages of the invention will be readily apparent from the specification and from the drawings.

DETAILED DESCRIPTION OF THE INVENTION

Figure 1:
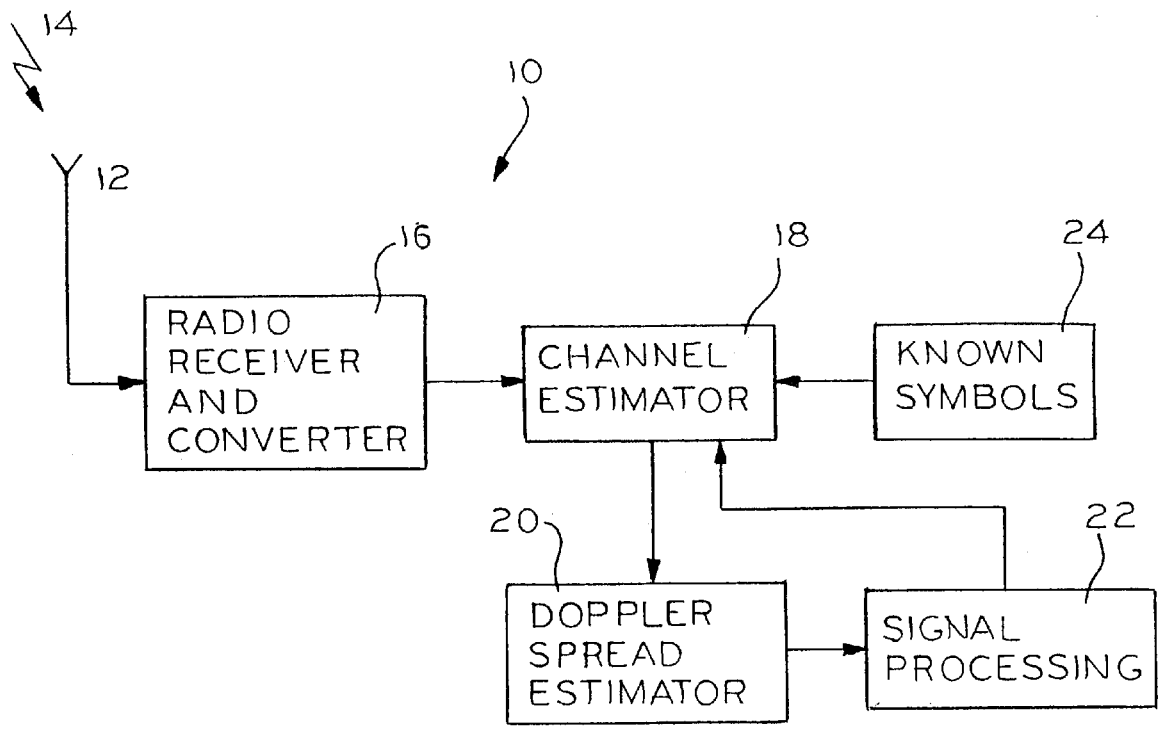
FIGS. 1–3 are block diagrams of receiving apparatus including a Doppler spread estimator according to the invention.

Referring to FIG. 1, a receiving apparatus 10 according to the invention is illustrated. The receiving apparatus 10 is adapted for use with known pilot symbols. The receiving apparatus 10 includes an antenna 12 for receiving radio signals represented at 14. The antenna 12 is coupled to a radio receiver and converter 16. The radio receiver and converter 16 filters amplified signals and converts them to a suitable form for processing, such as complex numerical sample values. The signals are in the nature of digital samples for processing. The radio receiver and converter 16 is coupled to a channel estimator 18. The channel estimator 18 is connected to a Doppler spread estimator 20 and receives known symbols from a known symbol block 24. The known symbols comprise pilot or reference symbols also included in the received signal used for determining channel estimates. The known symbols are stored in a memory or generated locally in a code generator. The channel estimator 18 correlates the received digital samples with the known symbols to provide channel estimate to the Doppler spread estimator 20. The Doppler spread estimator 20 estimates the Doppler spread which is sent to a signal processing block 22. The signal processing block 22 processes the sampled signal to extract information. The signal processing block 22 is also connected to the channel estimator 18 so that after Doppler estimation the channel estimation can be improved.

Figure 2:
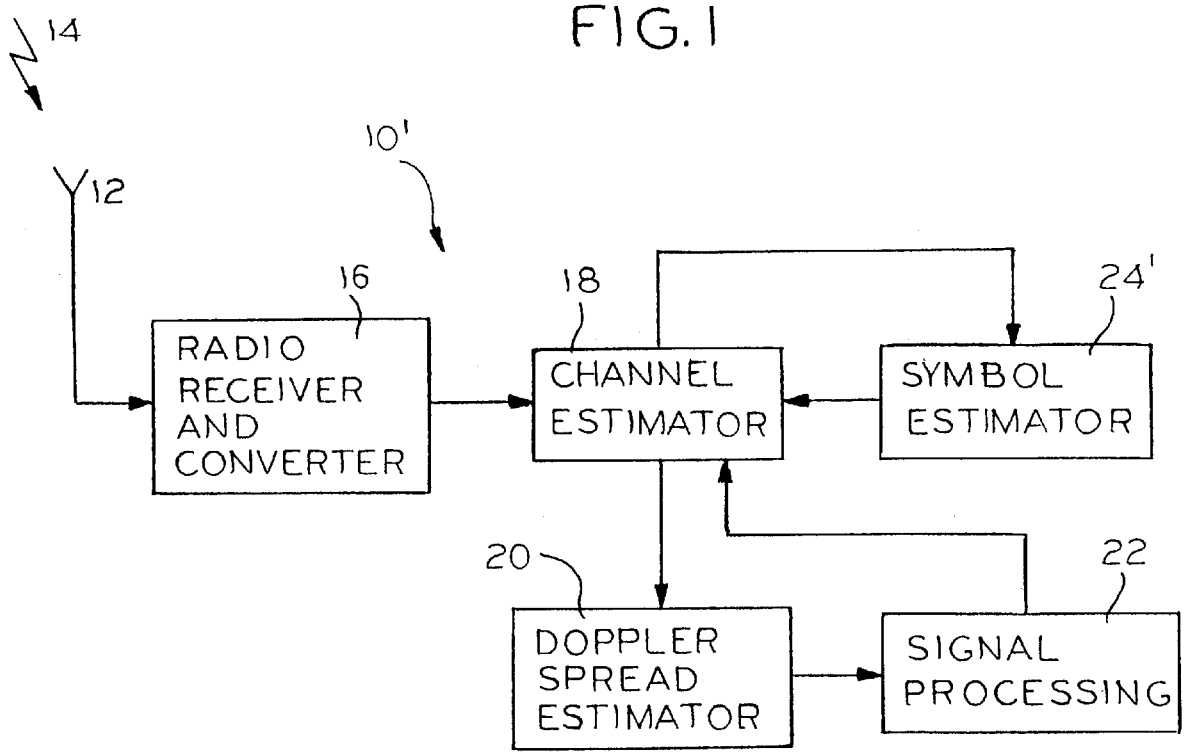

Referring to FIG. 2, a block diagram of a receiving apparatus 10' is illustrated. The receiving apparatus 10' is generally similar to the receiving apparatus 10 of FIG. 1. For simplicity, like elements are referenced with like numerals, while modified elements are indicated with primed numerals. Particularly, the receiving apparatus 10' differs in replacing the known symbols at block 24 with a symbol estimator 24'. This receiving apparatus is used in an application where symbols are unknown. The channel estimator 18 attempts to estimate the symbols, which are then stored in the symbol estimator 24'. The estimated symbols are subsequently used by the channel estimator 18 for determining channel estimates, as above.

Figure 3:
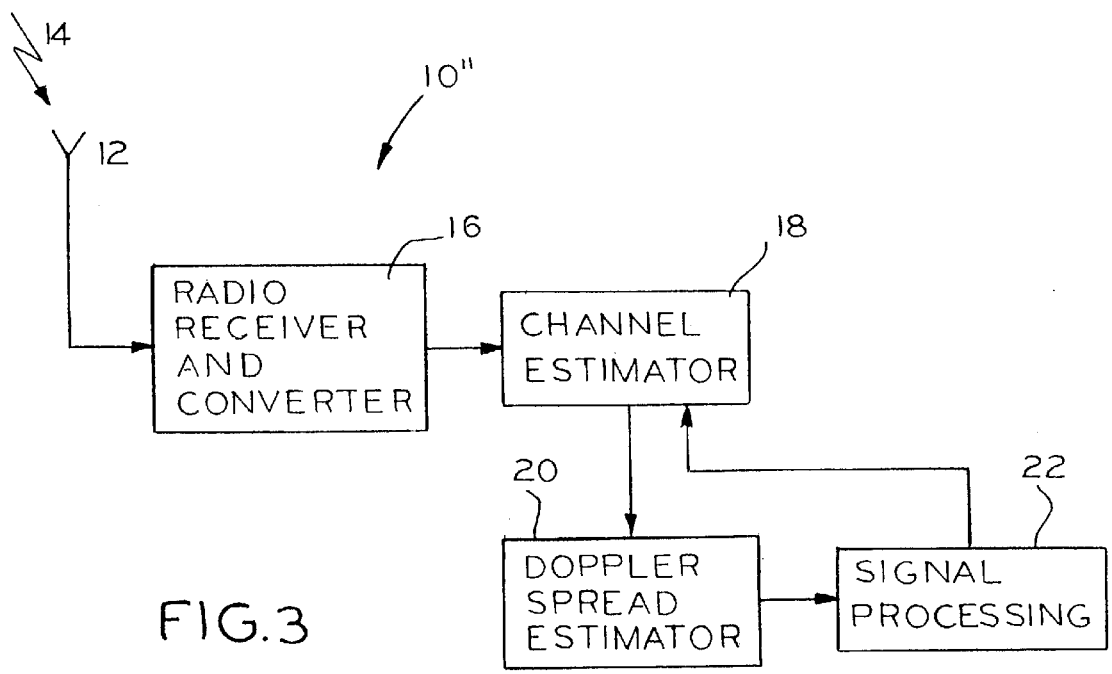

In the United States code-division multiple access (CDMA) cellular system known as IS-95, a transmitter transmits a stream of known symbols known as the pilot code. The pilot code is transmitted on the same channel at the same time as other, information bearing, symbols using different spreading codes. FIG. 3 illustrates a receiving apparatus 10" used in such a CDMA system. With CDMA systems the channel can be estimated directly to be used for Doppler spread. In this case, the known symbol block 24 of FIG. 1 is omitted. The channel estimator 18 correlates the received signal, comprising the pilot code and other codes in additive superimposition, with the known pilot code, and low pass filters the resultant complex correlation to obtain channel estimates. The received signal is also correlated with other codes carrying information it is desired to decode. The results of correlating with information carrying codes are multiplied by the conjugate of pilot code correlations for the same delay, and the results added to coherently combine the multi-path signals.

In wide band CDMA (WBCDMA) systems, modulation symbol intervals are much shorter. This allows multiple propagation paths to be resolved with much finer time resolution.

In mobile communication systems, the received signal in a flat Rayleigh channel can be described by the following baseband model:

$$r(t)=s(t) \cdot c(t)+n(t), \quad (1)$$

where $$s(t) = \sum_n d_n p(t - n\Delta t), \quad (2)$$

$d_n$ is an n-th transmitted symbol, p(t) is a transmitted pulse, c(t) is a complex Gaussian process with mean zero and envelope correlation function $$K_c(\tau)=\sigma_c^2 J_0(\omega_d \tau), \quad (3)$$

$\sigma_c^2$ is a variance of the process c(t), $J_0(\chi)$ is a Bessel function of the first kind and of order zero, $\omega_d = \omega_0 v/c_0$, $\omega_0$ is a carrier frequency, v is a mobile's velocity, $c_0$ is a light speed, and n(t) is white noise with the spectral density g.

There are two conventional approaches for the basic Doppler spread estimation solution. These approaches are spectral analysis of the received signal or correlation analysis of the received signal. With spectral analysis of the received signal:

$$\hat{S}(k) = \frac{1}{Q}\sum_{q=0}^{Q-1}\left|\sum_{i=qN}^{(q+1)N-1} r_i \exp\left(-j2\pi\frac{ki}{N}\right)\right|^2, \quad (4)$$

where $$r_i = d_i c_i + n_i, \quad (5)$$

$r_i$, $c_i$, and $n_i$ are the i-th samples of the processes r(t), c(t), and n(t), respectively. For this algorithm an estimate of the Doppler spread can be expressed in terms of FFT coefficients:

$$\hat{f}_d = \frac{f_q}{N}\arg[\max \hat{S}(k)] \quad (6)$$

where $f_q$ is a sampling frequency.

With correlation analysis of the received signal:

$$\hat{K}(m) = \frac{1}{NQ}\sum_{i=1}^{NQ} r_i \cdot r_{i+m}^* \quad (7)$$

An estimate of the Doppler spread can be expressed in terms of the correlation function $\hat{K}(m)$, calculated for some value $m_0$:

$$\hat{f}_d = \frac{f_q}{2\pi m_0}K_c^{-1}[\hat{K}(m_0)] \quad (8)$$

where $K_c^{-1}(\tau)$ is a function which is the inverse of the function $K_c(\tau)$.

However, a vector $r=(r_1, \ldots, r_N)$ is a time-varying, non-stationary random discrete process. Traditional spectral analysis does not work for non-stationary processes. To solve this problem, the present invention takes into consideration that $d_i = \exp(j\phi_i)$. Then, the algorithm $$\hat{r}_i = (\hat{d}_i)^* \cdot r_i, \quad (9)$$

where $\hat{d}_i$ is an estimate of the symbol $d_i$, transforms the non-stationary vector r to the stationary vector $\hat{r}=(\hat{r}_1, \ldots, \hat{r}_N)$ Indeed, for non-dispersive channels $\hat{d}_i \approx d_i$. Besides, statistical characteristics of the noises $n_i$ and $\hat{n}_i = \hat{d}_i \cdot n_i$ are the same, because $|\hat{d}_i|^2 = 1$. Therefore, $$\hat{r}_i \approx c_i + \hat{n}_i \quad (10)$$

It is possible to improve the algorithm (9) by using the moving average:

$$\hat{r}_i = \frac{1}{N_0} \sum_{n=iM}^{iM+N_0-1} (\hat{d}_n)^* r_n, \quad (11)$$

In this case the errors $\Delta d_n = \hat{d} - d_n$ are reduced and Equation (10) becomes more precise. For CDMA systems, channel coefficients (more exactly, channel coefficients estimates $\hat{c}_i$) are directly obtained. In this case, channel coefficient estimates can be processed instead of $\hat{r}_i$.

In accordance with the invention the non-stationary vector r is transformed to reduce the problem to analysis of the stationary vector $\hat{r}$. Thereafter, the invention uses the optimal approach for estimating Doppler spread. This approach uses a criterion of the maximum of likelihood ratio. The optimal estimation algorithm is obtained by using the following equation:

$$\left\{ \frac{\partial \Lambda(\hat{r} \mid f_d)}{\partial f_d} \right\}_{f_d = \hat{f}_d} = 0, \quad (12)$$

where $\Lambda(\hat{r}|f_d)$ is the likelihood ratio which is formed based on the vector $\hat{r}$.

Because the vector $\hat{r}$ has a Gaussian distribution, with the accuracy up to an inessential constant, the following equation can be written for the log-likelihood ratio:

$$\Lambda(\hat{r} \mid f_d) = \sum_{k=0}^{n/2-1} G_H(k \mid f_d) \cdot \hat{S}(k) \quad (13)$$

where $G_H(k|f_d)$ is a weight function which corresponds to some value of the Doppler spread $f_d$.

The method of estimating Doppler spread in accordance with the invention utilizes stationarization of the received signal, spectral analysis of the stationary vector, and correlation of the spectral estimate. Particularly, for stationarization of the received signal:

$$\hat{r}_i = \frac{1}{N_0} \sum_{n=iM}^{iM+N_0-1} (\hat{d}_n)^* r_n, \quad (14)$$

Spectral analysis of the stationary vector $\hat{r}=(\hat{r}_1, \ldots, \hat{r}_N)$ using a fast Fourier transform (FFT):

$$\hat{S}(k) = \frac{1}{Q} \sum_{q=0}^{Q-1} \left| \sum_{i=qN}^{(q+1)N-1} \hat{r}_i \exp\left(-j2\pi \frac{ki}{N}\right) \right|^2 \quad (15)$$

Correlation is done in the frequency domain of the spectral estimate $\hat{S}(k)$ with L weight functions $G_H(k|f_d)$ which correspond to L values of the Doppler spread $f_d$:

$$\Lambda(\hat{r} \mid f_d) = \sum_{k=0}^{N/2-1} G_H(k \mid f_d) \cdot \hat{S}(k), \quad (16)$$

where $f_d = \{f_d(1), \ldots, f_d(L)\}$ is a vector of Doppler spread hypotheses. One of the Doppler spread hypothesis $f_d(m)$ is selected if:

$$\Lambda(\hat{r}|f_d(m)) > \Lambda(\hat{r}|f_d(p)) \quad (17)$$

Figure 4:
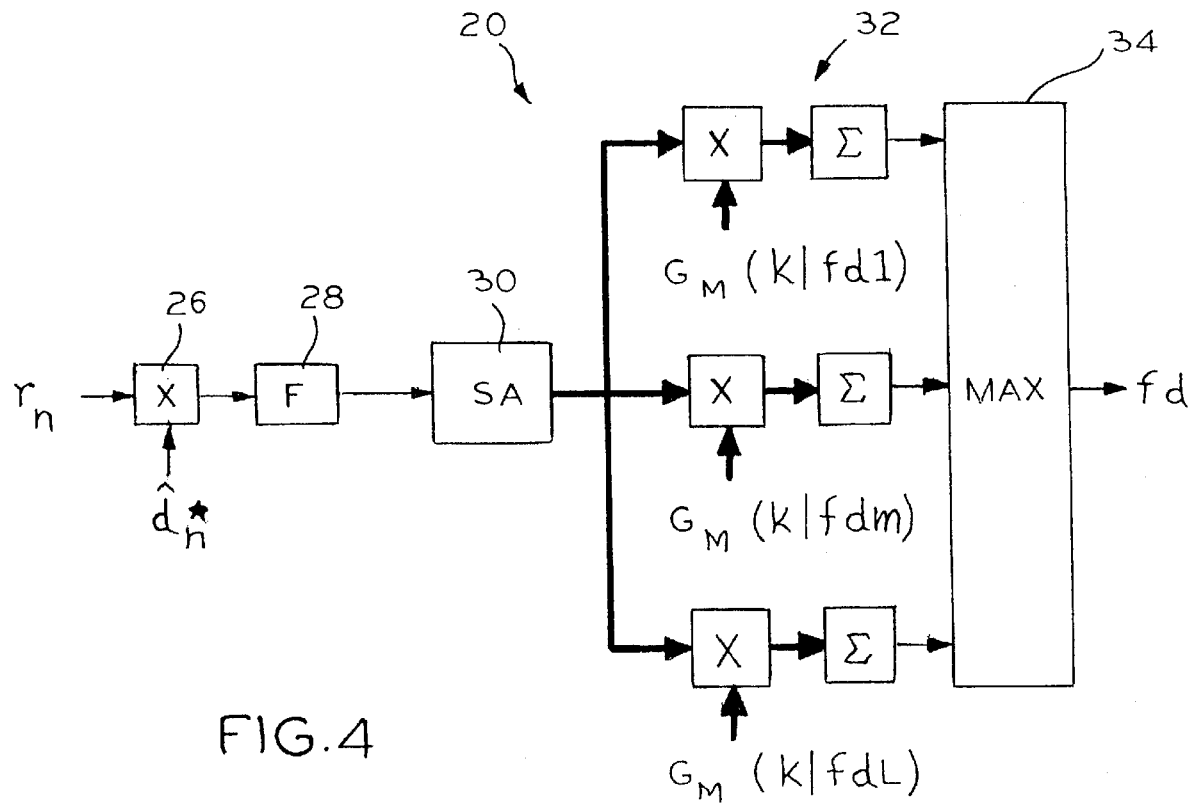
FIG. 4 is a block diagram of the Doppler spread estimator according to the invention.

FIG. 4 illustrates a block diagram of the Doppler spread estimator 20 of FIG. 1. Stationarization of the received signal is performed using a multiplier 26 and low pass filter 28. The multiplier 26 receives the sampled received signals $r_n$ which are multiplied with the complex conjugate of the transmitted symbols $\hat{d}_n^*$. The radio receiver and converter block 16, see FIG. 1, is the source of the received signal $r_n$. The source of the complex conjugate of the transmitted symbols can be the channel estimator 18 or the known symbols 24. The output of the multiplier 26 is passed through a low pass filter 28 which reduces statistical errors $\Delta d_n = \hat{d}_n - d_n$ of the transmitted symbol estimation and out-of-band noise.

The output of the filter 28 is coupled to an input of a second processing block 30. The block 30 estimates the spectral density of the incoming signal $\hat{r}_i$ using the algorithm of Equation (15). The output, represented in bold lines, indicates that the output data is in the form of vector data which are the spectral components $\hat{S}=[\hat{S}(1), \ldots, \hat{S}(N/2)]$.

The output of the block 30 is fed to an input of a third processing function 32 in the form of a multi-channel correlator which produces the likelihood ratio metrics using Equation (16). Each channel of the correlator calculates correlations in frequency domain between the spectral estimate $\hat{S}(k)$ and the waiting function $G_H(k|f_d)$. The waiting function $G_H(k|f_d(m))$ for the m-th channel corresponds to some selective value $f_d(m)$ of the Doppler spread. Particularly, these comprise hypotheses of plural Doppler spread values. The likelihood ratio metrics are compared with each other using Equation (16). The outputs are applied to a max function block 34. On the basis of comparisons between the likelihood ratio metrics of L Doppler spread hypotheses, the multi-channel correlator 32 generates the decision that the Doppler spread is $f_d(m)$ if the m-th channel has the maximum output value.

The illustrated method for estimating Doppler spread can be used in WCDMA or IS-95 systems, since in these systems known symbols or pilot symbols are periodically inserted into the data stream at every slot.

As will be appreciated by one of ordinary skill in the art, the present invention may be embodied as methods or devices. Accordingly, the present invention may take the form of an entirely hardware embodiment, an entirely software embodiment, or an embodiment combining hardware and software aspects. The present invention has been described in part with respect to the block diagram illustrations of FIGS. 1–4. It will be understood that each block of the illustrations, and combinations of blocks, can be implemented by computer program instructions. These program instructions, which represent steps, may be provided to a processor to produce a machine.

Accordingly, blocks of the block diagrams support combinations of means for performing the specified functions in combinations of steps for performing the specified functions. It will be understood that each block of the illustrations, and combinations of blocks, can be implemented by special purpose hardware-based systems which perform the specified functions or steps, or combinations of special purpose hardware and computer instructions.

Thus, in accordance with the invention, a Doppler spread estimator utilizes stationarization of non-stationary received signals and calculates correlation functions which are compared to hypotheses to determine an accurate and reliable estimate of Doppler spread.

We claim:

1. A Doppler spread estimator comprising:
   receive means for receiving signals over a transmission channel that varies over time due to fading and converting the signals to digital samples for processing, wherein said received signals represent a sequence of transmitted symbols;
   first processing means operatively associated with the receive means for estimating spectral densities of the digital samples;
   second processing means operatively coupled to the first processing means for correlating the spectral density estimates with functions corresponding to hypotheses of plural Doppler spread values to select one of said Doppler spread values as an estimate of actual Doppler spread; and
   third processing means comprising a multiplier for mixing the digital samples with a complex conjugate of the transmitted symbols, the third processing means being operatively associated with the receive means for stationarizing the digital samples prior to estimating spectral densities of the digital samples.

2. The Doppler spread estimator of claim 1 wherein said receive means is adapted to receive Code-Division Multiple Access (CDMA) signals.

3. The Doppler spread estimator of claim 2 wherein channel coefficients are directly obtained from the CDMA signals.

4. The Doppler spread estimator of claim 1 wherein said receive means is adapted to receive signals including pilot symbols spread with a known CDMA spreading code.

5. The Doppler spread estimator of claim 1 wherein said complex conjugate of the transmitted symbols is derived from a symbol estimator.

6. The Doppler spread estimator of claim 1 wherein said third processing means further comprises a low pass filter.

7. The Doppler spread estimator of claim 1 wherein said first processing means develops vector data representing spectral components.

8. The Doppler spread estimator of claim 1 wherein said second processing means comprises a multichannel correlator.

9. The Doppler spread estimator of claim 8 wherein said correlator calculates correlations between estimated spectral densities and weighting functions corresponding to the hypotheses of the plural Doppler spread values.

10. The Doppler spread estimator of claim 9 wherein the second processing means includes a selector for selecting the hypothesis producing a highest correlation value.

11. A receiving apparatus Doppler spread estimator comprising:
    a receiver receiving signals over a transmission channel that varies over time due to fading and converting the signals to digital samples for processing, wherein said received signal represents a sequence of transmitted symbols;
    an estimator operatively associated with a stationarizer for estimating spectral densities of stationarized digital samples;
    a correlator operatively coupled to the estimator for correlating the spectral density estimates with functions corresponding to hypotheses of plural Doppler spread values to select one of said Doppler spread values as an estimate of actual Doppler spread; and
    a stationarizer, comprising a multiplier for mixing the digital samples with a complex conjugate of the transmitted symbols, the stationarizer operatively associated with the receiver for stationarizing the digital samples prior to estimating spectral densities of the digital samples.

12. The receiving apparatus Doppler spread estimator of claim 11 wherein said receiver is adapted to receive Code-Division Multiple Access (CDMA) signals.

13. The Doppler spread estimator of claim 12 wherein channel coefficients are directly obtained from the CDMA signals.

14. The receiving apparatus Doppler spread estimator of claim 11 wherein said receiver is adapted to receive signals including pilot symbols spread with a known CDMA spreading code.

15. The receiving apparatus Doppler spread estimator of claim 11 wherein said complex conjugate of the transmitted symbols is derived from a symbol estimator.

16. The receiving apparatus Doppler spread estimator of claim 11 wherein said stationarizer further comprises a low pass filter.

17. The receiving apparatus Doppler spread estimator of claim 11 wherein said estimator develops vector data representing spectral components.

18. The receiving apparatus Doppler spread estimator of claim 11 wherein said correlator comprises a multichannel correlator.

19. The receiving apparatus Doppler spread estimator of claim 18 wherein said correlator calculates correlations between estimated spectral densities and weighting functions corresponding to the hypotheses of the plural Doppler spread values.

20. The receiving apparatus Doppler spread estimator of claim 19 wherein the correlator includes a selector for selecting the hypothesis producing a highest correlation value.

21. The method of estimating Doppler spread of a received signal, comprising the steps of:
    receiving the signals over a transmission channel that varies over time due to fading and converting-the signals to digital samples for processing, wherein said received signal represents a sequence of transmitted symbols;
    stationarizing the digital samples by multiplying the digital samples with a complex conjugate of the transmitted symbols;
    estimating spectral densities of stationarized digital samples; and
    correlating the spectral density estimates with functions corresponding to hypotheses of plural Doppler spread values to select one of said Doppler spread values as an estimate of actual Doppler spread.

22. The method of claim 21 wherein said receiving step receives Code Division Multiple Access signals.

23. The Doppler spread estimator of claim 22 wherein channel coefficients are directly obtained from the CDMA signals.

24. The method of claim 21 wherein said receiving step receives signals including pilot symbols spread with a known CDMA spreading code.

25. The method of claim 21 wherein said complex conjugate of the transmitted symbols is derived from a symbol estimator.

26. The method of claim 21 wherein said stationarizing step comprises low pass filtering the mixed samples.

27. The method of claim 21 wherein said estimating step develops vector data representing spectral components.

28. The method of claim 21 wherein said correlating step comprises using a multichannel correlator.

29. The method of claim 28 wherein said correlator calculates correlations between estimated spectral densities and weighting functions corresponding to the hypotheses of the plural Doppler spread values.

30. The method of claim 29 wherein the correlating step includes selecting the hypothesis producing a highest correlation value.

* * * * *